United States Patent

Oishi et al.

[11] 4,108,394
[45] Aug. 22, 1978

[54] SEATBELT RETRACTOR FOR MOTOR VEHICLES

[75] Inventors: Susumu Oishi, Nagoya; Masahiro Iwatsuki, Toyoake, both of Japan

[73] Assignee: Tokai-Rika-Denki-Seisakusho, Japan

[21] Appl. No.: 833,819

[22] Filed: Sep. 16, 1977

[30] Foreign Application Priority Data

Sep. 17, 1976 [JP] Japan .............. 51-125549[U]

[51] Int. Cl.² ............... A62B 35/02; B65H 75/48
[52] U.S. Cl. ............................ 242/107.4 A
[58] Field of Search ........... 242/107.4 A, 107.4 R, 242/107.4 B, 107.4 C, 107.4 D, 107.4 E; 297/388; 280/744–747; 74/577 R, 577 M

[56] References Cited

U.S. PATENT DOCUMENTS

| 3,889,898 | 6/1975 | Ziv | 242/107.4 A |
| 3,944,162 | 3/1976 | Henderson | 242/107.4 A |
| 3,983,314 | 10/1976 | Booth | 242/107.4 A |

*Primary Examiner*—Harvey C. Hornsby
*Assistant Examiner*—John M. Jillions

*Attorney, Agent, or Firm*—Koda and Androlia

[57] ABSTRACT

A seatbelt retractor including a frame, a retracting shaft rotatably coupled to the frame which retracts a seatbelt thereon, a locking gear coupled to the retracting shaft, a first and a second pawl provided adjacent to the locking gear and independently rotatably coupled to the frame such that when the first and second pawl rotate they engage with the locking gear and prevent rotation of the retracting shaft in the extending direction. A rocker arm pivotably supported at a pivot point and having a first catch pin at one end thereof which engages with a portion of the first pawl and a second catch pin at the other end thereof which engages with a portion of the second pawl such that the first pawl is caused to engage with the locking gear when the rocker arm rotates in one direction about the pivot point and such that the second pawl is caused to engage with the locking gear when the rocker arm rotates in the other direction about the pivot point and an acceleration sensing member which causes the pivot point to move during a motor vehicle emergency such that at least one of the first and second pawl is caused to rotate.

6 Claims, 6 Drawing Figures

SEATBELT RETRACTOR FOR MOTOR VEHICLES

BACKGROUND OF THE INVENTION

1. Field of the Invention

This invention relates to seatbelt retractors for motor vehicles and more particularly to seatbelt retractors for motor vehicles which only prevent extension of the seatbelt during motor vehicle emergencies such as collisions, etc.

2. Prior Art

In prior art there are seatbelt retractors which prevent the extension of the seatbelt only during motor vehicle emergencies. During a motor vehicle emergency in such prior art seatbelt retractors, an acceleration sensing member causes a pawl to dip such that the pawl engages with a locking gear attached to a seatbelt retracting shaft thereby preventing the rotation of the retracting shaft in the direction of seatbelt extension. Since the rotation of the retracting shaft in the direction of seat belt extension is thus checked, the body of the vehicle passenger wearing the seatbelt is restrained such that the passenger is not thrown in the direction of the collision during the vehicle emergency. Accordingly, the safety of the passenger is assured.

Further, in this type of a seatbelt retractor system, however, the tips of the pawl sometimes strike the tips of the teeth of the locking gear during the initial stages of engagement between the pawl and the locking gear. This phenomenon is known as "tip-to-tip condition" and is an extremely dangerous condition for a person wearing the seatbelt. This condition is known to be a contributing cause of severe injury during accidents. Specifically, the passenger is accelerated in the direction of the collision during a vehicle emergency thereby causing the retracting shaft to rotate abruptly in the direction of seatbelt extension so that the pawl which has struck the tips of the teeth of the locking gear is kicked back considerably by the locking gears. Accordingly, a relatively long period of time is required before the pawl is securely engaged with the locking gears. During this relatively long period of time, the seatbelt extends to a considerable extent so that the passenger is insufficiently restrained and is therefore placed in an extremely dangerous situation.

SUMMARY OF THE INVENTION

Accordingly, it is the general object of the present invention to provide a seatbelt retractor system which assures the safety of the seatbelt user by quickly and surely stopping the extension of the seatbelt when the vehicle is involved in a vehicle emergency such as a collision, etc.

In keeping with the principles of the present invention the objects are accomplished by a unique seatbelt retractor including a frame, a retracting shaft rotatably coupled to the frame which retracts a seatbelt thereon, at least one locking gear coupled to the retracting shaft, a first and a second pawl provided adjacent to the locking gear and independently rotatably coupled to the frame such that when the first and second pawl rotate they engage with the locking gear and prevent rotation of the retracting shaft in the seatbelt extending direction, a lever pivotably coupled to the frame, a rocker arm pivotably coupled to the lever and having a first catch pin at one end which engages with a portion of the first pawl and a second catch pin at the other end thereof which engages with a portion of the second pawl such that the first pawl is caused to engage with the locking gear when the rocker arm rotates in one direction about its pivot and such that the second pawl is caused to engage with the locking gear when the rocking arm rotates in the other direction about its pivot and an acceleration sensing member which causes the lever to move during a vehicle emergency such that at least one of the pawls is caused to rotate by the first and second catch pins.

BRIEF DESCRIPTION OF THE DRAWINGS

The principles and objects of the present invention will become more apparent in the following description taken in conjunction with the following drawings wherein like elements are given like reference numerals and wherein.

DETAILED DESCRIPTION OF THE INVENTION

Figure 1:
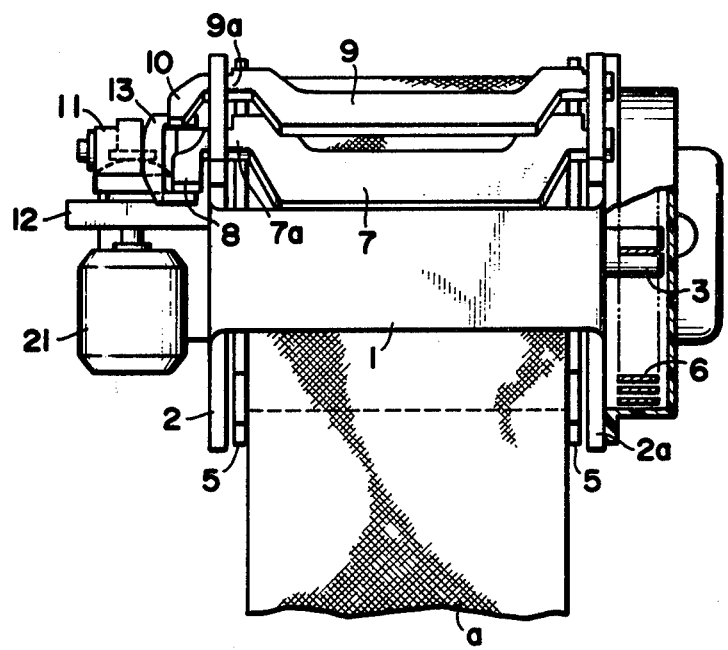
FIG. 1 is a front view illustrating one embodiment of a seatbelt retractor in accordance with the teachings of the present invention.
Figure 2:
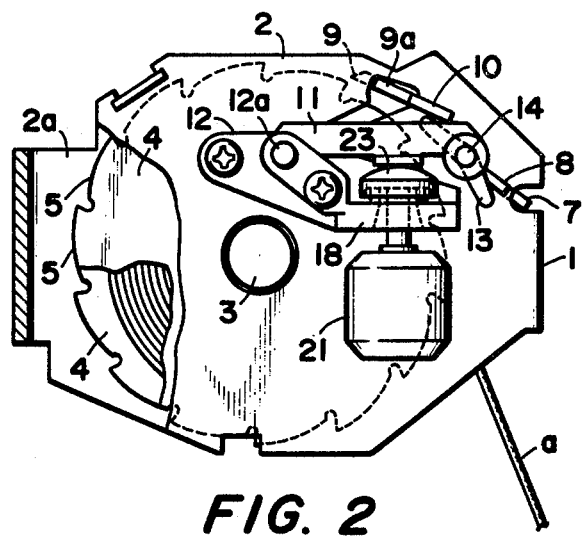
FIG. 2 is a side view of FIG. 1.

Referring more particularly to the Figures, the seatbelt retractor includes a retractor case 1. An automatic retracting shaft 3 is provided cross-wise between opposing walls 2 and 2a located on both sides of the case 1. A pair of discs 4 which form a reel are coupled to the retracting shaft 3 within the opposing walls 2 and 2a of the case 1. Saw tooth form locking gears 5 are formed around the circumference of the discs 4. A flat spiral spring 6 is confined between the outside surface of one 2a of the opposing walls and one end of the retracting shaft 3. One end of a seatbelt is fastened to the automatic retracting shaft 3 between the discs 4. Accordingly, the retracting shaft 3 is powered in the retracting direction of the seatbelt a. by the spring 6.

First and second pawls 7 and 9 are provided cross-wise between the opposing walls 2 and 2a so that they face the circumferences of the locking gears 5. The first and second pawls 7 and 9 are almost of equal weight. The two pawls 7 and 9 are supported by means of a conventional support structure in which the axial portions 7a and 9a are supported by means of a conventional support structure in which the axial portions 7a and 9a (which are rectangular in cross-section) of the pawls 7 and 9 are passed through roughly trapezoidal apertures provided in the opposing walls 2 and 2a. The pawls are installed at slightly different angular positions with respect to the tangent of the retracting shaft 3. Protruding portions 8 and 10 which project to the rear of the axial portions 7a and 9a are integrally formed in the portions of the pawls 7 and 9 which project outwardly of the opposing wall 2.

The position of the center of gravity of each pawl 7 and 9 is fixed such that the weight of each pawl causes a rotational force to act in a clockwise direction about the axial portion 7a and 9a of the pawls 7 and 9. A lever 11 is pivotally coupled to a bracket 12 attached to the outside of the opposing wall 2 by a pivot pin 12a. Rocker arm 13 is pivotally coupled to the free end of lever 11 by a pivot pin 14. Catch pins 15 and 16 project from both ends of rocker arm 13 on either side of the central pivot pin 14. The catch pins 15 and 16 are in contact respectively with the undersurfaces of the protruding portions 8 of the first pawl 7 and the protruding portion 10 of the second pawl 9. A support 18 which has a horizontal plane 19 (facing the undersurface of the free end of lever 11) and a central opening 20 is formed in the bracket 12. An acceleration pendulum 21 which is one example of an acceleration sensing member is supported on support portion 18 by shaft 22 passing through the central opening 20 and a head 23 coupled to the upper end of the shaft 22. The head 23 is in contact with the surface of the horizontal plane 19 of the supporting portion 18. The shaft 22 is screwed into the pendulum 21. A curved surface 24 is formed in the top of the head 23 and a projecting rim 25 which surrounds the circumference of the horizontal plane 19 is formed within the circumference of the underside surface of the head 23. The inside of the rim 25 is also tapered. The lever 11 is supported at substantially a horizontal angle by the curved surface 24.

When the lever 11 is thus maintained in a roughly horizontal attitude, the catch pins 15 and 16 of the rocker arm 13 are both in light contact with the protruding portions 8 and 10 of the pawls 7 and 9 and the pawls 7 and 9 are kept disengaged from the locking gears 5 by their own weight. It would also be possible to use a solenoid, which causes a plunger to protrude when a circuit is opened or closed by the sensing action of an acceleration switch, as the acceleration member instead of the accelerating sensing pendulum 21. In such a case it would be possible to achieve the same effect of the illustrated embodiment by attaching the solenoid to the supporting bracket 21 and causing the plunger to contact the surface of lever 11 when the plunger is in the normal position for being caused to protrude.

Figure 3:
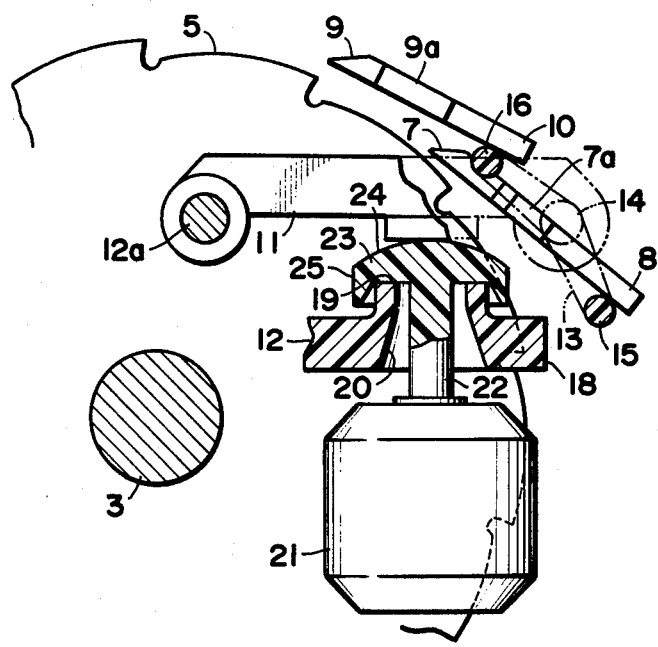
FIG. 3 is an expanded cross-sectional view illustrating the essential parts of the embodiment of FIG. 1.

In operation, when the vehicle is in normal condition, the acceleration sensing pendulum 21 hangs in a stable position such that the undersurface of the head 23 is in contact with the surface of the horizontal plane 19 of the supporting portion 18 (as shown in FIG. 3). Accordingly, the lever 11, the free end is supported by the curved surface 24, is maintained in a horizontal position as shown in FIG. 3 and the first pawl 7 and the second pawl 9 are maintained in positions in which their weights are balanced. Therefore, the catch pins 15 and 16 are pushed by the protruding portions 8 and 9 so that the rocker arm 13 is maintained in the attitude shown in the figures. Accordingly neither the first pawl 7 or the second pawl 9 engage with the locking gears 5.

Figure 4:
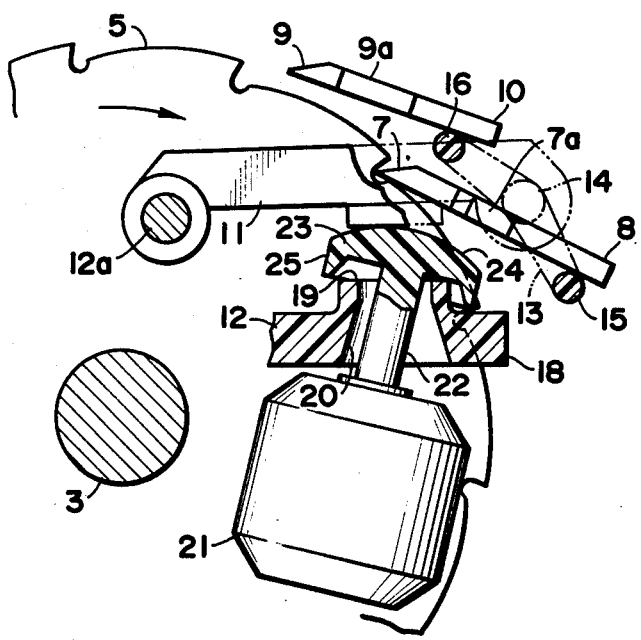
FIGS. 4 through 6 illustrate the operation of the embodiment shown in FIG. 3.

When the vehicle is stopped abruptly or involved in a collision, etc., the body of the passenger is caused by inertia to move forward so that the belt a. tends to be abruptly extended. Accordingly, locking gears 5 begin to turn in a clockwise direction (with reference to the figures). At this time, however, the acceleration sensing pendulum 21 is caused to incline as shown in FIG. 4. Accordingly the head 23 tilts on fulcrum formed by a point on the horizontal plane 19 and raises the free end of lever 11. The rocker arm 13 is lifted together with the lever 11 so the protruding portion 8 is pushed by the catch pin 15. This causes the first pawl 7 to mesh with the locking gears 5 which have abruptly began to rotate in the direction indicated by the arrow (see FIG. 4).

Figure 5:
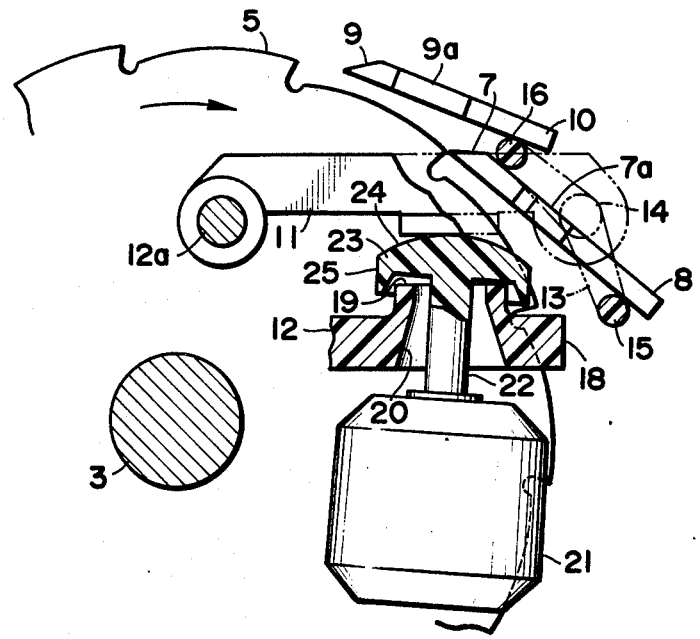
Figure 6:
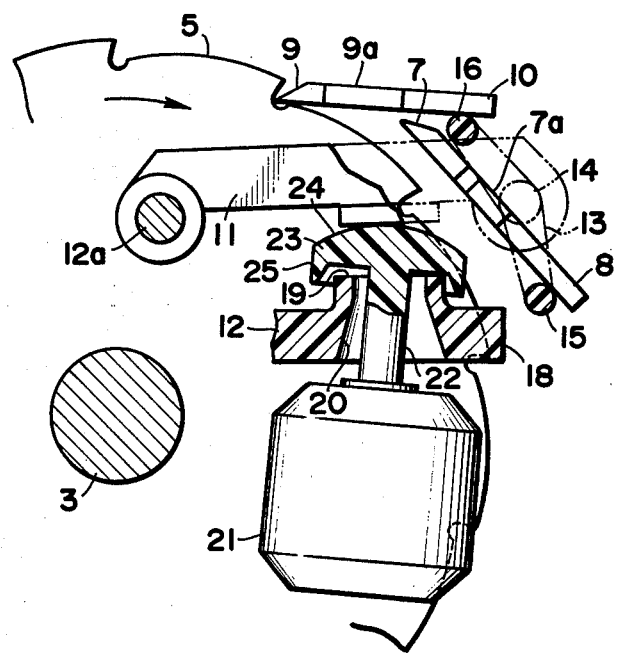

If the first pawl 7 should strike the tips of the teeth of the locking gears 5 and thus fail to mesh (as shown in FIG. 5), the pawl 7 will rebound upwardly and rotate in a clockwise direction (with reference to FIG. 5) so that the protruding portion 8 pushes the catch pin 13 downwardly thereby causing the rocker arm 13 to rotate in a clockwise direction about the pivot pin 14 so that the protruding portion 10 is lifted by the catch pin 16. This causes the second pawl 9 to rotate in a counterclockwise direction so that it engages with the locking gear 5 as shown in FIG. 6.

In this case, the failure of the first pawl 7 to engage creates a rebounding force which is used to an advantageous manner. Specifically, the rebounding force is used as the energy to cause forceable engagement of the second pawl 9 with the locking gear 5. Accordingly, the extension of the seatbelt a. is stopped abruptly so that there is no danger that the body of the seatbelt user will be thrown in the direction of vehicle motion during a collision.

In order to insure that the first pawl 7 is caused to engage with the locking gear 5 before the second pawl 9 (as described above) it is necessary to design the system so that the rocker arm 13 rotates in counter clockwise direction about the pivot pin 14 thereby insuring that the catch pin 15 causes pawl 7 to dip without catch pin 16 causing pawl 9 to dip. For this reason it is necessary to fix the weights and centers of gravity of the various parts such that the force generated by the weight of pawl 9, which causes catch pin 16 to rotate in a counter clockwise direction about pivot pin 14, is greater than the force generated by the weight of pawl 7, which causes the catch pin 13 to rotate in a counter clockwise direction about the pivot pin 14.

If the second pawl 9 is caused to mesh with the locking gear 5 first (during a vehicle emergency), it then goes without saying that exactly the opposite arrangement is required. The purpose of this invention is to reliably stop the extension of the seatbelt during a vehicle emergency no matter which pawl is caused to engage with the locking gears 5 first. Furthermore, it would also be possible to use auxiliary springs to keep each of the pawls disengaged from the locking gears.

Furthermore, the undesirable condition in which both pawls are successively kicked back by the tips of the teeth of the locking gears can be easily avoided by fixing the distance between the tips of the pawls such that it differs from the pitch between the tips of the teeth of the locking gears.

In all cases it is understood that the above described embodiment is merely illustrative of but one of the possible embodiments which represent the applications of the principles of the present invention. Numerous and varied other arrangements can be readily devised by those skilled in the art without departing from the spirit and scope of the invention.

We claim:

1. A seatbelt retractor comprising:

a frame;

a retracting shaft rotatably coupled to said frame which retracts a seatbelt thereon;

at least one locking gear coupled to said retracting shaft;

first and second pawls provided adjacent said locking gear and independently rotatably coupled to said frame such that when said first and second pawl rotate they respectively engage with said locking gear and prevent rotation of said retracting shaft in a seatbelt extending direction;

a rocker arm pivotally supported at a pivot point and having a first catch pin at one end thereof which engages with said first pawl and a second catch pin at the other end thereof which engages with said second pawl such that the first pawl is caused to engage with said locking gear when said rocker arm rotates in one direction about said pivot point and such that said second pawl is caused to engage with said locking gear when said rocker arm rotates in the other direction about said pivot point; and an acceleration sensing member which causes the pivot point to move during a sudden deceleration of a vehicle such that at least one of said first and second pawls is caused to rotate and engage with said locking gear.

2. A seatbelt retractor according to claim 1 wherein said pivot point is located on a lever which is pivotally coupled to said frame and said lever is caused to pivot by said acceleration sensing member.

3. A seatbelt retractor according to claim 2 wherein said acceleration sensing member is a pendulum.

4. A seatbelt retractor according to claim 2 wherein the weight applied to one end of the rocker arm by one of said pawls is greater than the weight applied to the other end of the rocker arm by the other one of said pawls.

5. A seatbelt retractor according to claim 1 wherein the distance between the tips of the first and second pawls is less than the pitch between the tips of the teeth of said locking gear.

6. A seatbelt retractor according to claim 1 wherein the angles that said first and second pawls make with a tangent to said locking gear are different.

* * * * *